(12) United States Patent
Shoji et al.

(10) Patent No.: US 8,042,179 B2
(45) Date of Patent: Oct. 18, 2011

(54) FALSE CODE EXECUTION PREVENTION METHOD, PROGRAM FOR THE METHOD, AND RECORDING MEDIUM FOR RECORDING THE PROGRAM

(75) Inventors: Koichiro Shoji, Kanagawa (JP); Yoshiyasu Takafuji, Kanagawa (JP); Takashi Nozaki, Kanagawa (JP)

(73) Assignee: Science Park Corporation, Zama-shi, Kanagawa (JP)

( * ) Notice: Subject to any disclaimer, the term of this patent is extended or adjusted under 35 U.S.C. 154(b) by 1367 days.

(21) Appl. No.: 10/570,502

(22) PCT Filed: Sep. 3, 2004

(86) PCT No.: PCT/JP2004/012858
§ 371 (c)(1),
(2), (4) Date: Nov. 20, 2006

(87) PCT Pub. No.: WO2005/024630
PCT Pub. Date: Mar. 17, 2005

(65) Prior Publication Data
US 2007/0101317 A1 May 3, 2007

(30) Foreign Application Priority Data
Sep. 4, 2003 (JP) ................................. 2003-312517

(51) Int. Cl.
G06F 12/14 (2006.01)
G06F 9/44 (2006.01)
G06F 7/04 (2006.01)
H04L 29/06 (2006.01)

(52) U.S. Cl. ......... 726/22; 726/1; 726/2; 726/4; 726/23; 726/24; 726/25; 726/26; 726/30; 713/164; 713/165; 713/167; 713/187; 713/188; 713/189; 713/193; 717/124; 717/125; 717/126; 717/127; 717/128; 717/129; 717/130; 717/131; 717/132; 717/133; 717/134; 717/135; 712/227; 712/239; 712/240; 710/52

(58) Field of Classification Search ............. 726/22, 726/26; 713/164–165, 167, 187–188; 717/127–128; 712/227
See application file for complete search history.

(56) References Cited

U.S. PATENT DOCUMENTS
5,257,269 A * 10/1993 Hamauchi .................. 714/43
(Continued)

FOREIGN PATENT DOCUMENTS
JP 2-304635 12/1990
(Continued)

OTHER PUBLICATIONS
International Search Report dated Oct. 12, 2004 of PCT/JP2004/012858.

Primary Examiner — Edan Orgad
Assistant Examiner — Jenise E Jackson
(74) Attorney, Agent, or Firm — Westerman, Hattori, Daniels & Adrian, LLP

(57) ABSTRACT

A method for preventing a return address from being falsified due to a buffer overflow during the program execution, and for detecting the buffer-overflow beforehand.
When the return address is re-written during program execution, the debug function of the central processing unit is used to output an error. The falsification of the return address is detected through the error output. Then the falsified return address is re-written to a value stored in advance to enable the program to return to normal operation. When the falsification of the return address is detected, the executing program is terminated.

20 Claims, 16 Drawing Sheets

U.S. PATENT DOCUMENTS

| | | | |
|---|---|---|---|
| 6,947,047 B1 * | 9/2005 | Moy et al. | 345/501 |
| 7,093,237 B2 * | 8/2006 | Moser et al. | 717/129 |
| 2001/0004766 A1 * | 6/2001 | Koyama | 717/4 |
| 2003/0037225 A1 * | 2/2003 | Deng et al. | 712/227 |
| 2003/0065929 A1 * | 4/2003 | Milliken | 713/189 |
| 2003/0093685 A1 * | 5/2003 | Tobin | 713/200 |
| 2003/0126590 A1 * | 7/2003 | Burrows et al. | 717/154 |
| 2004/0103252 A1 * | 5/2004 | Lee et al. | 711/132 |

FOREIGN PATENT DOCUMENTS

| | | |
|---|---|---|
| JP | 9-128267 | 5/1997 |
| JP | 2001-511271 | 8/2001 |

* cited by examiner (Procedure during program execution)

FIG.6

```
1 :      main()
2 :      {
3 :
4 :      sub(Data1);
5 :
6 :      sub(Data2);
7 :
8 :      }

10 :     sub(char* Data){
11 :     int i;
12 :     char buf[64];
13 :
14 :     strcpy(buf,Data)
15 :
16 :     return;
17 :     }
```

FALSE CODE EXECUTION PREVENTION METHOD, PROGRAM FOR THE METHOD, AND RECORDING MEDIUM FOR RECORDING THE PROGRAM

FIELD OF THE INVENTION

The present invention relates to a false code execution prevention method for protecting a program running on an electronic computer from an imperfect operation of the program due to a false code or from an external attack. The present invention also relates to a program for the method and a recording medium for recording the program.

In particular, the present invention relates to a false code execution prevention method for improving the imperfect operation of a program by detecting a buffer-overflow, and also relates to a program for the method and a recording medium for recording the program.

BACKGROUND ART

An operating system operating on an electronic computer is designed with complex architecture. Therefore, the operating system has a vulnerability called a security hole. The security hole is a vulnerable structure due to a defect or a bug of the software design. By intruding inappropriately into the operating system, taking advantage of the security hole of the operating system, a malicious user may perform a malicious action such as hacking, cracking, etc. A method using a buffer-overflow occurring in a memory is used as the means for the malicious action.

Herein, the buffer-overflow is described. A program running on the electronic computer consists of two parts, which are a program code and program data. The program code is a read-only code written in a machine code. The program data is an information part, such as the memory address of the program code that is executed by the execution instructions of the operating system.

Generally, the program is stored in the hard disk of the electronic computer. The program is called up by the operating system and is executed. At this time, the entire or a part of the program is stored in RAM (Random Access Memory), which is the main memory of the electronic computer. The main memory is the memory that can read and write data directly from the CPU (Central Processing Unit) of the electronic computer. The main memory is managed by applying a memory address to each unit that stores data. The main memory is divided into a high memory address (High Memory) area and a low memory address (Low Memory) area. The high memory address area is an area that has addresses with small numbers. When the address number grows, it is defined as low memory address area. Hereafter, the main memory is described only as memory.

When the program is loaded by the operating system, a part of the memory is allocated for the program. The program data is stored in the high memory area of the allocated memory. And the program code is stored in the low memory area of the allocated memory. The program data is divided into the three data areas of stack data, heap data, and static data. These three data areas are arranged in the memory mutually independent of each other. When the program for execution is called up by the operating system from the hard disk, at first the program code is loaded and stored in the memory. The program data is continuously loaded and stored in the memory.

FIG. 5 is a schematic showing the architecture of the memory in the electronic computer. The high address side of the memory is a stack memory area. Whenever the program is executed, stack memories for the program and the subroutine of the program are reserved in the stack memory area. The stack memories are stored in order to the lower memory address side of the memory. The stack memory consists of an argument area, a return address area, a stack data area, etc.

The low memory address side of the memory consists of areas such as a heap data area, a static data area, a program code area, etc. The static data area is located more to the high memory address side than the program code area. The static data area is the memory area where global variables and static C++ class members are reserved. The heap data area is located more to the high memory address side than the static data area. The heap data area is the area allocated for malloc( ), alloc( ) functions of C language and for "new" operator of C++ language.

The stack memory area is accessed by the LIFO (Last-in, first-out) method. Function parameters e.g. the return address, local variables, etc. are stored in the stack memory. The return address indicates the address of the instruction, which follows the end of the executing instruction. This return address is the most important value.

FIG. 6 shows a program written in C language as an example. When the program is executed, the main( ) function is executed at first (Line 1 to Line 3), then sub(Data1) of the subroutine in Line 4 is called up, and the processing of the program is shifted to Line 10. In the sub( ) subroutine, the processing is shifted to the original address, which is called sub( ), by the return instruction in Line 16. At this time, it is explained how the data is stored in the memory.

As shown in FIG. 7, when the subroutine is called up, data is stored in the stack memory area. The "return address to main( )" is stored in the high memory address side of the stack memory area. Then, an area for storing local variables in the subroutine is reserved. In this example, variables i (in Line 11) and buf (in Line 12) are shown. The value of the argument Data of the subroutine is copied into buf by the strcpy instruction in Line 14. At this time, if the value of the Data argument is larger than the size of buf, the local variable i is overwritten. The return address to the main( ) routine is also overwritten only if the value is greater than the local variable i. Thus, if the data overflows the area, which is reserved for the data, of the memory, the overflowed data are stored in the area for another variable. This is the buffer-overflow. The return address is re-written to another value; therefore, the program can not operate normally.

Generally, when the program, the subroutine and the functions of the program are ended after the execution thereof, they are returned to the position indicated by the return addresses and the execution thereof is continued. However, as explained above, if the program has a defect in the structure, it becomes possible to overwrite the return address with the data overflowing the reserved area for the local variable during the writing of the data.

Generally, the program that produces the buffer-overflow due to re-writing the return address comes to be in an irregular running state. Depending on the circumstances, most programs get out of control or stop. When the return address returned to a memory address, which is intentionally prepared, the operating system continuously executes the instruction stored in this memory address without understanding that it is a false code. An attack taking advantage of the vulnerability caused by the buffer-overflow is the execution of the intentionally prepared code in this way.

The false code execution using the buffer-overflow cannot be grasped by the operating system, which is managing the execution of the program. To prevent this false code execution, it is very important that the means for preventing or to being able to detect the falsification or the re-writing of the return address.

Methods, for example, the following method 1 and method 2, are proposed to solve this problem. The method 1 is a method adding a correction to the operating system. The method 2 is a method making a mechanism for preventing the buffer-overflow in the compiler. The non-patent document 1 uses the method 1. In this project, to prevent the buffer-overflow of open source operating systems, the return address area of the stack is moved to another memory area where the function does not execute.

The non-patent document 2 uses the method 2. In this method, in the GCC compiler, the overwriting of data is detected by preparing a protection section in the lower memory area of the stack memory.

Moreover, in the case of patent document 1, a protection value area is defined in a memory device, and data of the stack memory is protected by preserving it in the protection value area, and the processing instruction is executed. Even if the processing instruction, such as a subroutine (and so on), is executed, the program counter is protected because the return address (and so on) is protected in the protection value area.
Non-patent document 1: Openwall Linux kernel patch project, URL: http://www.openwall.com/linux/
Non-patent document 2: StackGuard: Simple Stack Smash Protection go GCC, URL: http://www.immunix.com/~wagle
Patent document 1: US20010013094 A1-2001-08-09, "Memory device, stack protection system, computer system, compiler, stack protection method, storage medium and program transmission apparatus"

DISCLOSURE OF THE INVENTION

Problem to be Solved by the Invention

In each above-mentioned method, it is necessary that the program code be changed and rebuilt. Therefore, implementing these methods takes a lot of time. Moreover, the typical thing taking advantage of this false code execution is a computer virus. Conventionally, the prevention technique against the computer virus uses a signature method. It does not have any effect against an unknown attack pattern. Therefore, whenever troubles occur in the operating system, a change in the operating system or a provision of patch files is needed.

The present invention was made on the basis of the technical background discussed above and achieves the following objects. It is an object of the present invention to provide a method for preventing or detecting the falsifying of data being stored in the memory of an electronic computer. A further object of the present invention is to provide a program using the method, a recording medium for recording the program.

It is an object of the present invention to provide a method for preventing and detecting the falsification of a return address in a stack memory during the program execution.

It is another object of the present invention to provide a function, which can be used without modifying hardware, an operating system, kernel mode software or application software, for preventing a false code execution.

It is another further object of the present invention to provide a function effectively for preventing a false code execution when application software or kernel mode software has a vulnerability due to a buffer-overflow.

It is another further object of the present invention to provide a deterrence of the false code execution by detecting the false code before execution.

Means for Solving Problem

In order to achieve the above-mentioned objects, the present invention employs the following means.

The false code execution prevention method according to the invention 1 of the present invention is a method for detecting a buffer-overflow of a memory, the buffer-overflow being that a return address stored in the stack memory area of the memory is overwritten by the execution of a false code; and for preventing an occurrence of the buffer-overflow; when a program stored in the storage medium of an electronic computer is executed by a central processing unit.

The false code execution prevention method is characterized by backing up the return address; and detecting a falsification of the return address using a debug function of the central processing unit, when the return address is falsified by the execution of the false code.

Preferably, the memory address storing the return address is recorded in the debug register used for the debug function; and the detection is performed by the production of an error signal by the central processing unit, when the value of the memory address registered in the debug register is falsified.

Further preferably, the backing up is performed by preserving the return address in a memory area that is not storing the data of an executing program. Further preferably, the false code execution prevention method further comprises a means for detecting the buffer-overflow by comparing the return address stored in the stack memory area to the address backed up.

Further preferably, the false code execution prevention method further comprises a controlling means for re-writing the memory address to the return address that is preserved, when the return address is falsified.

Further preferably, the return address is preserved by setting the stack memory area storing the return address to the read-only attribute; the detection is performed by production of an error signal from the central processing unit, when performing writing in the stack memory area that is set to the read-only attribute; and the method further comprises a controlling means for stopping the program or for controlling the flow of the program after receiving the error signal.

Preferably, the return address is a return address of one or more selected from a group including a process, which is called up when the program is executed, and a thread called from the process.

The false code execution prevention program according to the invention 2 of the present invention is characterized as follows. The false code execution prevention program is a program allowing an electronic computer to operate as for detecting a buffer-overflow of a memory, the buffer-overflow being that a return address stored in a stack memory area of the memory is overwritten by the execution of a false code; and for preventing an occurrence of the buffer-overflow; when a program stored in the storage medium of the electronic computer is executed by the central processing unit.

The false code execution prevention program comprises the steps of analyzing a branch instruction contained in the program by obtaining the branch instruction, when the program is called up from the storing medium; extracting the return address of a process or a thread of the program; registering the address of the stack memory area storing the return address in the debug address of a debug function of the central processing unit; controlling the flow of the program when the program is executed; backing up the return address and the address by registering the return address and the address; wherein the central processing unit outputs an error signal due to the debug function when the return address is falsified in the execution of the program, the execution of the program is interrupted, and the flow of the program is moved to the controlling step.

Preferably, the controlling step has a step for stopping the program, in case the return address is re-written.

Further preferably, the controlling step has a step for re-writing the return address to the return address backed up, in case the return address is re-written.

Further preferably, the controlling step has a step for preserving the re-written value, in case the return address is re-written.

Preferably, the false code execution prevention program further comprises steps of protecting the return address by setting the stack memory area storing the return address to the read-only attribute; detecting for the performing of the detection by output of an error signal by the central processing unit, when performing writing in the stack memory area, which is set on the read-only attribute; and controlling for stopping the program or controlling the flow of the program after receiving the error signal.

Further preferably, the program is one or more selected from a group including application software, a software module of an operating system, kernel mode software, functions used therein, and subroutines used therein.

The recording medium for the false code execution prevention program according to the invention 3 of the present invention is a recording medium that records above-mentioned false code execution prevention program.

Effects of the Invention

The present invention has the following effects.

A false code prevention method of the present invention can prevent the execution of a false code without modifying hardware, an operating system, kernel mode software or application software.

A false code prevention method of the present invention can respond effectively when application software or kernel mode software has a vulnerability due to a buffer-overflow.

A false code prevention method of the present invention can deter the execution of a false code by detecting the false code before being executed.

DETAILED DESCRIPTION OF THE PREFERRED EMBODIMENTS

Below, the preferred embodiments of the present invention will be described by referring to the figures.

First Embodiment

Now, the first embodiment of the present invention will be described.

The present invention provides a method for detecting an act that is falsifying data stored in the main memory of an electronic computer by re-writing the data. By implementing this method, the present invention further provides a program for detecting the act and restoring the re-writing or falsified data. The present invention further provides a recording medium for recording the program. The outline of the embodiment of the present invention will be described.

A debug function of a CPU is a function for detecting an error that occurs during the execution of an application program. Therefore, a number of memories, called debug registers, are prepared in the CPU. And the debug registers are used for observing the operation of a specific address in the main memory. An address and a CPU event for the observation are registered in the debug registers. If the value of this address is changed, the CPU detects it and outputs an error signal. And, interrupting the execution of the application program has the possibility of putting another program into operation.

In the first embodiment, the operation of a program for detecting the false code execution taking advantage of a buffer-overflow and for preventing data falsifying, etc., is described. When a program operates on the electronic computer, as described in the background art, whenever the program, subprograms, functions are called up, return addresses thereof are stored in a stack memory area. The addresses, storing the return addresses, of the main memory are recorded in the debug registers of the CPU of the electronic computer.

Simultaneously, the return addresses are backed up into another area of the main memory. When data stored in these addresses are falsified, the CPU detects an error. Then, the executing program is interrupted and the control is moved to another program. Thus, it is possible to prevent data falsification and the execution of the false code. The return addresses backed up are re-written to the original addresses, and the program is returned to the normal operation. Moreover, the re-written addresses are backed up and it is possible to use them for the pattern analysis on the computer virus attack taking advantage of the buffer-overflow.

Next, to realize detection of the data falsification using the debug registers and restoration of the falsified data, the false code execution prevention method of the first embodiment of the present invention provides a driverware layer and an error routine. The driverware layer has the following functions. The functions are a function for grasping the return addresses described above, a function for registering the return addresses in the debug registers, and a function for backing up the return addresses. When the data of the return address is falsified, the error routine provides a function for correcting the falsification. The first embodiment of the present invention is described in detail below.

FIG. 1 shows an outline of the embodiment of the present invention. FIG. 1 shows software 1, a driverware 2, a file system driver 3, and a hard disk 4 that are operating on the electronic computer. Generally, an executable program is stored in the hard disk 4 as an executable file 5. The executable program is loaded by the load command provided by the operating system, and stored in a memory 6. The software 1 means an application program operating on the electronic computer. It is allowable that this application program be any program running on a kernel mode or a user mode of the operating system.

The driverware 2 is located between the file system driver 3 and the services provided by the operating system. The driverwear 2 is a program that controls loading from and/or writing to each device of the electronic computer from the operating system.

The file system driver 3 is a driver for loading data stored in storing devices that are built into or connected with the electronic computer, and for writing data to these storing devices. Usually, the hard disk 4 is a hard disk built into the electronic computer. However, if the software 1 is stored in it and is executable through access from the operating system, the hard disk 4 may be an external storing device such as an external hard disk, a flash memory, CD-ROM, etc.

In the first embodiment, the instruction that calls up the program (the executable file 5 of FIG. 1) from the operating system, is transmitted to the file system driver 3 through the driverware 2.

The file system driver 3 loads the program from the hard disk 4, and passes it to the driverware 2. The driverware 2 analyzes the program, understands the main routine and the subroutine, acquires each return address, and performs the control for detecting the buffer-overflow. The return address is an address being output by a branch instruction, such as a CALL instruction, etc. The return address is stored in the stack memory, and the return address is an address for returning by executing RET or RETxx instructions.

This series of operations is explained with reference to the flowchart of FIG. 3. The program (the executable file 5 of FIG. 1) is started by the operating system or the application program (Step 1). The driverware 2 detects the start of the program (Step 2). The driverware 2 analyzes the program, understands the main routine and the subroutine, and acquires each return address. The driverware 2 examines arguments, local variables and function addresses that are generated by the starting of the program (Step 3), and preserves the function addresses. Concretely, the driverware 2 acquires the return addresses by examining the executing events of the branch instructions, such as call (CALL), return (RET, RETN), and jump (JMP), that are being executed in the program, and the return addresses are preserved (Step 4).

While the program is executing, it is possible to set the control of the program to be moved to the driverware 2 by hooking the branch instructions such as the call instruction (Call instruction) etc. (Step 5). Concretely, this is performed by calling up PsSetLoadlmageNotifyRoutine( ) provided by the OS and registering a callback function (LoadlmageNotifyRoutine) that is called up at the start of the process. In the thread generation, the starting address of _beginthread( ) is acquired, and the breakpoint is set in this starting address. When the program is being executed, the driverware 2 embeds the function for protecting the return addresses and detecting the falsification of the return addresses in the stack memory (Step 6).

The protection of the return addresses uses the debug function of the CPU mentioned above. Thus, there is a function among the debug functions of the CPU for outputting an error when a specific memory address is re-written. By implementing this function, the control can be moved to a specific address. At this time, the memory address of the return address is specified in the debug register of the CPU. When the error is detected, the operating system issues an interrupt instruction and moves the control to the driverware 2.

This function is applied to the return address. Therefore, the error is detected by the debug function when the return address is re-written, and it is set so that the control is moved to the driverware 2. The driverware 2 executes the program specified in step 1 (Step 7).

FIG. 4 is a flowchart showing a procedure for detecting the buffer-overflow while the program is started and executed.

When the program is being executed by the operating system or the application program, the call instruction (Call instruction) is executed, and the interrupt of the CPU is generated. The control moves to the driverware 2 (Step 10 to Step 11). The driverware 2 examines arguments, local variables, and function addresses that are generated by the execution of the program (Step 12). The driverware 2 protects or performs storing of the return addresses in the stack memory by the debug function (Step 13).

This protection is performed by setting the stack memory storing the return address to the read-only attribute. The CPU outputs an error when writing to this stack memory. The interrupt of the CPU is generated, and the control is moved to the driverware 2. Thus, the return address cannot be falsified or changed and it is possible to protect the return address. The above-mentioned performing of the storing is achieved by backing up the return address that is stored in the stack memory and by preserving it to another area of the memory. When the return address is falsified, it becomes possible to verify the falsification by comparing the return address with the backed up return address.

The driverware 2 issues an instruction (IRET) (Step 14), returns the control to the execution address, which was interrupted in Step 11 (Step 15), and executes it (Step 16).

With the buffer-overflow during the program execution, the return address is overwritten, and the CPU outputs an error. Or, immediately before returning from the called function, the driverware 2 compares the return address stored in Step 13 with the return address stored in the stack (Step 17 to Step 19). The driverware 2 detects the error (Step 20), and the execution of the program is interrupted. The control then moves to the error routine (Step 21). When an error is detected, the error routine (not shown) is executed. The error routine is a program with functions for stopping the program execution, for preserving the contents of the stack memory, and for re-writing the return address to the data preserved beforehand. This error routine can also stop or continue the program execution, and can preserve the false code (Step 22).

An example of an attack on the electronic computer from outside [of the electronic computer] is shown in FIG. 2. External data, including viruses, false codes, etc., are transmitted through a network card 10. The external data is stored in the memory 6 via the network card 10, an NDIS11, and a Winsock12. When the external data are stored in the memory 6, all or a part of the return addresses of the program are re-written, and the CPU outputs the error. Then, the control is moved to the driverware 2. Receiving this error detection, the driverware 2 responds to it by hooking the error routine.

Thus, all inappropriate intrusions and attacks taking advantage of the buffer-overflow can be grasped and dealt with. The process under execution can be stopped, the contents stored in the stack memory can be preserved, the execution of the former process can be continued, etc. By the process under execution being stopped, a program, which is out of control, can be prevented. By preservation of the contents stored in the stack memory, it is possible for the false code to be preserved. And by analysis of the preserved false code, the type and the pattern of the attacks and the viruses can be understood.

The present embodiment is adjusted not only for the application program operating in the user mode, but also for the program operating in the kernel mode. Moreover, it is possible to adjust it to all programs using the buffer-overflow technique by implementing the same method.

Example

An example of the first embodiment of the present invention is described below. The present example uses a 32-bit architecture processor, having an instruction trace function, from Intel Co.®. Concretely, it is a processor developed after PentiumPro®, or a processor compatible with this processor. The operating system is Windows2000® from Microsoft Corporation.

The driverware 2 operates and processes the initialization as the preparation for detecting the buffer-overflow. The driverware 2 detects the process and the thread that are generated during the program execution, grasps the main routine and the subroutines, and operates the process interruption processing as an error routine when the driverware 2 detects the buffer-overflow. These operations will be described below in detail.

The driverware starts executing, and performs the initialization (Refer to FIG. 8, and the explanation described later). In this initialization, the process and the thread, which are generated when the program is called up, are detected. Details of this initialization are shown in the flowcharts of FIG. 8, FIG. 9 and FIG. 10 (Described later).

After performing this initialization, the program begins operation. All branch instructions, such as jump (JMP), call (CALL), return (RET), etc., executed while this program is in operation, are registered and traced. When CALL, RET, and RETxx instructions are executed, [driverware 2] detects the buffer-overflow. The detection of CALL, RET, and RETxx instructions is shown in the flowcharts of FIG. 11 and FIG. 12.

After detecting CALL, RET, and RETxx instructions, processes are shown in the flowcharts of FIG. 13 to FIG. 16 and in the program code in the description corresponding to these flowcharts.

Initialization Process

The flowchart of FIG. 8 shows an outline of the initialization. First of all, the driverware starts, and the process name, observing the buffer-overflow, is loaded from the registry (Step 100). A process generation callback in the process under observation is then registered (Step 101). The registration of this process generation callback is shown in the flowchart of FIG. 9 in detail. Afterwards, the stack recorder is initialized, and the memory area is secured (Step 102). Then, the hook setting of the thread generation event of the thread of the object to be observed (Step 103) is performed. After that, the tracing of the execution instruction is begun.

The registration of the process generation callback is performed by calling up PsSetLoadlmageNotifyRoutine( ) provided by the OS, and by registering the callback function (LoadlmageNotifyRoutine) called at the process starting. This callback function is defined by the following prototype.

```
[Program code 1]
void LoadImageNotifyRoutine(
    PUNICODE_STRING FullImageName,
    HANDLE ProcessId,
    PIMAGE_INFO ImageInfo
)
```

Next, the registering procedure of the process generation callback is shown in the flowchart of FIG. 9. When the process is generated, the LoadimageNotifyRoutine function is called up (Step 110). Hereafter, the operations in LoadimageNotifyRoutine are shown. It is determined whether the process is an object under observation or not (Step 111). To make this determination, it is examined whether or not the process module name for the object exists in the argument FullImageName of the LoadimageNotifyRoutine function. The following process is executed when it exists (Yes).

The entry point address of the process module is acquired (Step 112). The header of the execution module file used with Windows is surveyed, and the address of the function (the entry point), first executed, is acquired. A breakpoint is then set in the entry point (Step 113). An example of the program code at this time is as follows.

[Program code 2]
PVOID ImageBase = (PVOID)ImageInfo->ImageBase;

```
MZ_HEADER *mz_Header = (MZ_HEADER *)ImageBase;
MZ_NE *mz_ne = (MZ_NE *)((char *)ImageBase +
sizeof(MZ_HEADER));
    IMAGE_NT_HEADERS *ImageNtHeaders =
        (IMAGE_NT_HEADERS *)((char *)ImageBase +
        mz_ne->ne_header);
char *EntryPoint =
        (char *)((ULONG)ImageInfo->ImageBase+
        ImageNtHeaders->OptionalHeader.AddressOfEntryPoint);
```

A trace function provided by IA-32 instruction is then enabled, and 01H of IDT (Interrupt Descriptive Table) is re-written for the registration of the trace callback function (ASO_Hook_INT01H) (Step 114). The program code for this registration is as follows.

```
[Program code 3]
IDTR idtr;
PIDTENTRY OIdt;
PIDTENTRY NIdt;
_asm{
        SIDT idtr;
}
OIdt = (PIDTENTRY)MAKELONG(idtr.LowIDTbase, idtr.HiIDTbase);
gOldINT01H_Handler = MAKELONG(OIdt[IGATE01].OffsetLow,
OIdt[IGATE01].OffsetHigh);
NIdt = &(OIdt[IGATE01]);
_asm{
        LEA EAX, ASO_Hook_INT01H //
        MOV EBX, NIdt;
        MOV [EBX], AX
        SHR EAX, 16
        MOV [EBX+6], AX;
        LIDT idtr
}
```

When the process starts, the hardware breakpoint is set to the instruction first executed, and the trace callback function (ASO_Hook_INT01H) is called up when the instruction is executed (Step 115). The program code for this is as follows.

```
[Program code 4]
MOV EAX, KickStartAddress    // address of instruction first executed
MOV DR0, EAX
MOV EAX, DR7
OR EAX, 0x00000000;// Set LEN0 = 00 (1 Byte Length)
OR EAX, 0x00000000;// Set R/W0 = 00 (On Execution Only)
OR EAX, 0x00000200;// Set GE
OR EAX, 0x00000002;// Enable G0
MOV DR7, EAX;                // Set DR7
```

The initialization of the stack recorder (See Step 102) is dynamically executed every time the thread in the specified process under observation is generated. Each stack of the stack recorder is defined as follows.

```
[Program code 5]
typedef struct_ASO_STACK_LIST{
    LIST_ENTRY m_ListEntry;
    ULONG ThreadId;
    ULONG *StackPointer;
    LONG CurrentStackLocation;
}ASO_STACK_LIST, *PASO_STACK_LIST;
```

The hook setting procedure of the thread generation event (See Step 103) is shown in the flowchart of FIG. 10. When the thread is generated (Step 120), it is determined whether or not the process is an object under observation (Step 121). The starting address of beginthread( ) is acquired when the generated thread is the process under observation (Step 122). The breakpoint is set in this starting address (Step 123). After that, the tracing is begun (Step 124).

This process is applied to the system having two or more threads by hooking NtCreateThread. The NtCreateThread is a kernel API for generating the thread. Therefore, the interrupt handler (ASO_Hook_INT2EH) of vector 2E that is being passed through when NtCreateThread is called, is re-written. The program code at this time is as follows.

```
[Program code 6]
  IDTR idtr;
  PIDTENTRY OIdt;
  PIDTENTRY NIdt;
  _asm SIDT idtr;
  OIdt = (PIDTENTRY)MAKELONG(idtr.LowIDTbase, idtr.HiIDTbase);
  gOldINT2EH_Handler = MAKELONG(OIdt[IGATE2E].OffsetLow, OIdt[IGATE2E].OffsetHigh);
  NIdt = &(OIdt[IGATE2E]);
  _asm {
    CLI
    LEA EAX, ASO_Hook_INT2EH
    MOV EBX, NIdt;
    MOV [EBX], AX
    SHR EAX, 16
    MOV [EBX+6], AX;
    LIDT idtr
    STI
  }
}
```

The program code used by the hook setting of the thread generation event (CreateThread( )) is as follows.

```
[Program code 7]
KIRQL OldIrql;
KeRaiseIrql(HIGH_LEVEL, &OldIrql);
_asm {
  PUSHAD
  // for CreateThread( )
  MOV EAX, EBP            // current EBP
  MOV EAX, [EAX]          // previous EBP(ASO_Hook_INT2BH)
  MOV EAX, [EAX]          // previous EBP(CreateThread)
  ADD EAX, 0x10           // Stack + 10H (lpStartAddress)
  MOV EBX, [EAX]          // EBX <- Thread address
  CMP EBX, 0x7800BE4A     // if EBX == _beginthread's
                          start_address (2K+SP0)
  then
    JNZ SET_MEMORYBREAK
    // for_beginthread( )
    MOV EAX, EBP          // current EBP
    MOV EAX, [EAX]        // previous EBP(ASO_Hook_INT2BH)
    MOV EAX, [EAX]        // previous EBP(CreateThread)
    MOV EAX, [EAX]        // previous EBP(_beginthread)
    ADD EAX, 0x0C         // Stack + 0CH (start_address)
    MOV EBX, [EAX]        // EBX <- Thread address
  SET_MEMORYBREAK:
    PUSH EBX              // ParamI
    CALL InstallNewInt01Handler
    POPAD
}
```

Thus, the program is executed when a series of initialization processes end, and the branch instructions, such as CALL and RET, are traced. Next, tracing processes are shown in the flowcharts of FIG. 11 and FIG. 12. When the tracing processes are started (Step 150), the CALL instruction and the RET instruction are distinguished by clearing a trace flag of DR6 (Step 151). CALL, RET, and RETN instructions are distinguished when decentralizations of FIG. 11 and FIG. 12 are determined (Step 154 to Step 183). Each determination is moved to "To CALL processing", "To RET processing", and "To RETN processing" respectively. The "To CALL processing", the "To RET processing", and the "To RETN processing" are shown in the flowcharts of FIG. 13, FIG. 14 and FIG. 15 respectively.

When CALL, RET, and RETN instructions are distinguished, the program code is as follows.

```
[Program code 8]
// DR6 <- 0x00000000
  MOV EAX, DR6
  AND EAX, 0xFFFFBFFF
  MOV DR6, EAX
// EDX:EAX <- LastBranchFromIp
  MOV ECX, 0x000001DB;          // MSR =
                                  0x01DB(LastBranchFromIp)
  RDMSR;
  PUSH ES
  MOV BX, 0x001B
  MOV ES, BX
  MOV EDX, EAX
  MOV EAX, ES:[EAX]
  POP ES
//
// Branch on Instruction
//
  CMP AL, 0xE8                  // Relative near call
  JZ CALL_FOUND
  CMP AL, 0xFF                  // Direct near/far call
  JZ CALLORJMP_FOUND
  CMP AL, 0x9A                  // Direct far call
  JZ CALL_FOUND
  CMP AL, 0xC3                  // near RET
  JZ RET_FOUND
  CMP AL, 0xCB                  // far RET
  JZ RET_FOUND
  CMP AL, 0xC2                  // near RET with POP
  JZ RETN_FOUND
  CMP AL, 0xCA                  // far RET with POP
  JZ RETN_FOUND
  JMP CALL_NOTFOUND
CALLORJMP_FOUND:
  TEST AH, 0x10                 // CALL/2
  JNZ CALL_FOUND
  TEST AH, 0x18                 // CALL/3
  JNZ CALL_FOUND
  CMP AH, 0xE4                  // JMP ESP
  JZ JMPESP_FOUND
  JMP CALL_NOTFOUND
```

Here, the distinctions of CALL, RET, and RETN are encoded respectively as CALL_FOUND, RET_FOUND, and RETN_FOUND. In the branch instruction of the program code, if the branch instruction is jumped to the CALL_FOUND, it is assumed that the CALL instruction be executed and a process is performed as shown in the flowchart of FIG. 13. The process is performed similarly for RET and RETN.

FIG. 13 shows the process when the CALL instruction is executed. When the execution of the CALL instruction starts (Step 200), the address of the stack segment (CS) of the stack memory, allocated for the CALL instruction, is acquired (Step 201). The stack point of the return address stored by the CALL instruction is then acquired (Step 202). Afterwards, the return address is acquired from the stack memory (Step 203). The program code at this time is as follows.

```
[Program code 9]
CALL_FOUND:
```

```
PUSH ES
// Get Stack segment (CS)
MOV ECX, EBP
ADD ECX, +4+4+4+4+4+4
MOV EAX, [ECX]
MOV ES, AX
// Get Stack pointer
MOV ECX, EBP
ADD ECX, +4+4+4+4+4
LES EDX, [ECX]            // Now EDX point to Stack Address
// Get RetIP
MOV ECX, EDX
MOV AX, 0x001B            // Usermode Only
MOV ES, AX                //
MOV EDX, ES:[ECX]         // Retrieve RetIP on Stack
//
// Now EDX point to RetIP on Stack
//
POP ES
```

This acquired return address is registered in the stack recorder (Step 204). The program code at this time is as follows.

```
[Program code 10]
KeRaiseIrql(HIGH_LEVEL, &OldIrql);
PASO_STACK_LIST StackList =
(PASO_STACK_LIST)gStackList[ThreadId];
if (StackList == 0){
    // Error
}else if (StackList->CurrentStackLocation > STACK_LIMIT){
    StackList = NULL;
}else if (StackList->CurrentStackLocation >= 0){
    StackList->StackPointer[StackList->CurrentStackLocation] =
    ExpectedRetIp;
    StackList->CurrentStackLocation ++;
}
KeLowerIrql(OldIrql);
```

Then, MSR and EFLAG are set and the tracing instructions are restarted (Steps 205 and 206). Executing IRETD completes the processing.

FIG. 14 shows the processing when the RET instruction is executed. When the execution of the RET instruction starts (Step 250), the address of the stack segment (CS) of the stack memory allocated to the RET instruction is acquired (Step 251), and the stack pointer of the return address specified by the RET instruction is acquired (Step 252). Afterwards, the return address is acquired from the stack memory (Step 253). The program code at this time is as follows.

```
[Program code 11]
RET_FOUND:
PUSH ES
// Get Stack segment (CS)
MOV ECX, EBP
ADD ECX, +4+4+4+4+4+4
MOV EAX, [ECX]
MOV ES, AX
// Get Stack pointer
MOV ECX, EBP
ADD ECX, +4+4+4+4
MOV EAX, [ECX]
LES EDX, [ECX]            // Now EDX point to Stack Address
SUB EDX, +4               // Back 4Bytes from Current Stack
                          Address
MOV ECX, EDX
MOV AX, 0x001B
MOV ES, AX
MOV EDX, ES:[ECX]
```

Then, it is retrieved whether or not the same value as the return address exists in the stack recorder (Step 254). The return address is an address registered in the stack recorder when the execution of the CALL instruction corresponds to this RET instruction. However, when the return address is falsified, the same address is not found in the stack recorder. At this time, [the control] moves to the process interruption processing (Terminate_VirusCode( ) of the following code) (Step 260). If the same address is found, one record is deleted from the stack recorder (Step 255). The program code at this time is as follows.

```
[Program code 12]
KeRaiseIrql(HIGH_LEVEL, &OldIrql);
PASO_STACK_LIST StackList =
(PASO_STACK_LIST)gStackList[ThreadId];
if (StackList == 0){
    // Stack not found
}else if (StackList->CurrentStackLocation > 0){
    StackList->CurrentStackLocation --;
    ULONG ExpectedRetIp
        = StackList->StackPointer[StackList->CurrentStackLocation];
    StackList->StackPointer[StackList->CurrentStackLocation] = 0;
    if (ExpectedRetIp != ToIp){
        LONG i;
        BOOLEAN StackFound = FALSE;
        for (i = StackList->CurrentStackLocation; i >= 0; i --){
            if (StackList->StackPointer[i] == ToIp){
                LONG j;
                for (j = i; j <= StackList->CurrentStackLocation;
                j++){
                    StackList->StackPointer[j] = 0;
                }
                StackList->CurrentStackLocation = i;
                StackFound = TRUE;
                break;
            }
        }
        if (!StackFound){
            // Not found
            Terminate_VirusCode(FromIp, ToIp, ExpectedRetIp);
        }
    }
}else{
    DbgPrint(" Illegal Stack Location\n");
}
KeLowerIrql(OldIrql);
```

Then, MSR and EFLAG are set and the tracing instructions are restarted (Steps 256 and 257). Executing IRETD completes the processing.

FIG. 15 shows the processing when the RETN instruction is executed. When the execution of the RETN instruction starts (Step 300), the address of the stack segment (CS) of the stack memory allocated to the RETN instruction is acquired (Step 301), and the stack point of the return address specified by the RETN instruction is acquired (Step 302). Afterwards, the return address is acquired from the stack memory (Step 303). The program code at this time is as follows.

```
[Program code 13]
RETN_FOUND:
// Get Stack Byte Length
ADD EDX, +1
MOV EAX, [EDX]
PUSH ES
PUSH EAX
// Get Stack segment (CS)
MOV ECX, EBP
ADD ECX, +4+4+4+4+4+4
MOV EAX, [ECX]
```

-continued

```
MOV ES, AX
// Get Stack pointer
MOV ECX, EBP
ADD ECX, + 4 + 4 + 4 + 4
MOV EAX, [ECX]
LES EDX, [ECX]          // Now EDX point to Stack Address
POP EAX
MOVZX EAX, EAX
SUB EDX, EAX
SUB EDX, +4
MOV ECX, EDX
MOV AX, 0x001B
MOV ES, AX
MOV EDX, ES:[ECX]
```

Then, it is retrieved whether or not the same value as the return address exists in the stack recorder (Step 304). The return address is an address registered in the stack recorder when the execution of the CALL instruction corresponds to this RETN instruction. However, when the return address is falsified, the same address is not found in the stack recorder. At this time, [the control] moves to the process interruption processing (Terminate_VirusCode( ) of the following code) (Step 310). When the same address is found, one record is deleted from the stack recorder (Step 305). The program code at this time is as follows.

```
[Program code 14]
KeRaiseIrql(HIGH_LEVEL, &OldIrql);
PASO_STACK_LIST StackList =
(PASO_STACK_LIST)gStackList[ThreadId];
if (StackList == 0){
    // Stack not found
}else if (StackList->CurrentStackLocation > 0){
    StackList->CurrentStackLocation --;
    ULONG ExpectedRetIp
        = StackList->StackPointer[StackList->CurrentStackLocation];
    StackList->StackPointer[StackList->CurrentStackLocation] = 0;
    if (ExpectedRetIp != ToIp){
        LONG i;
        BOOLEAN StackFound = FALSE;
        for (i = StackList->CurrentStackLocation; i >= 0; i --){
            if (StackList->StackPointer[i] == ToIp){
                LONGj;
                for (j = i; j <= StackList->CurrentStackLocation;
                    j++){
                        StackList->StackPointer[j] = 0;
                    }
                StackList->CurrentStackLocation = i;
                StackFound = TRUE;
                break;
            }
        }
        if (!StackFound){
            // Not found
            Terminate_VirusCode(FromIp, ToIp, ExpectedRetIp);
        }
    }
}else{
    DbgPrint(" Illegal Stack Location\n");
}
KeLowerIrql(OldIrql);
```

Then, MSR and EFLAG are set and the tracing instructions are restarted (Step 306 and 307). Executing IRETD completes the processing.

FIG. 16 shows the processing when the JMP ESP processing is executed. JMP ESP is the instruction needed so that, for example, the virus, etc., which has intruded [into the electronic computer] via a network, executes the program code stored in the stack memory. Therefore, the JMP ESP instruction is set to be the prohibition target without depending on the retrieval result of the return address of the stack, because it is rare that an execution module uses the JMP ESP instruction. When JMP ESP is distinguished, the process interruption processing is performed (Step 351).

The process interruption processing in steps 260, 310 and 351 acquire the addresses of the instructions that are executed after the RET and RETN instructions, and re-write the addresses to false instructions (INT3 etc.). The execution of the process is continued, and the process is stopped by the false instruction. The program code at this time is as follows.

```
[Program code 15]
void_stdcall Terminate_VirusCode(ULONG FromIp, ULONG ToIp)
{
    IsDetected = TRUE;
    // Rewrite FromIp(Next instruction of JMP ESP) to INT3
    _asm {
        PUSH EAX
        PUSH EDX
        MOV AL, 0xCC       // INT 3
        MOV EDX, FromIp
        MOV SS:[EDX], AL
        POP EDX
        POP EAX
    }
}
```

It is possible to grasp and to deal with all inappropriate intrusions and attacks taking advantage of the buffer-overflow as mentioned above. Stopping the execution process can prevent the program from getting out of control.

It is also possible for all operating systems to be able to realize a buffer-overflow by applying this method.

(Another embodiment of the present invention)

FIELD OF INDUSTRIAL APPLICATION

The present invention is used in all fields where measures against computer viruses, the prevention of inappropriate intrusion from outside [of an electronic computer], and security are demanded. Especially, it is allowable to be used for systems using the personal computer, the super computer, and the server that are used in the connection of a network. It is used for systems related to electronic government, military affairs, and defense that demand security protection of individual information and electronic files.

Moreover, it is preferable to be used for detecting a defect of a program and an use of a false code.

BRIEF DESCRIPTIONS OF THE DRAWINGS

FIG. 6 is a drawing showing an example of the main routine and subroutines of a program.

EXPLANATION OF REFERENCE NUMERALS

Figure 1:
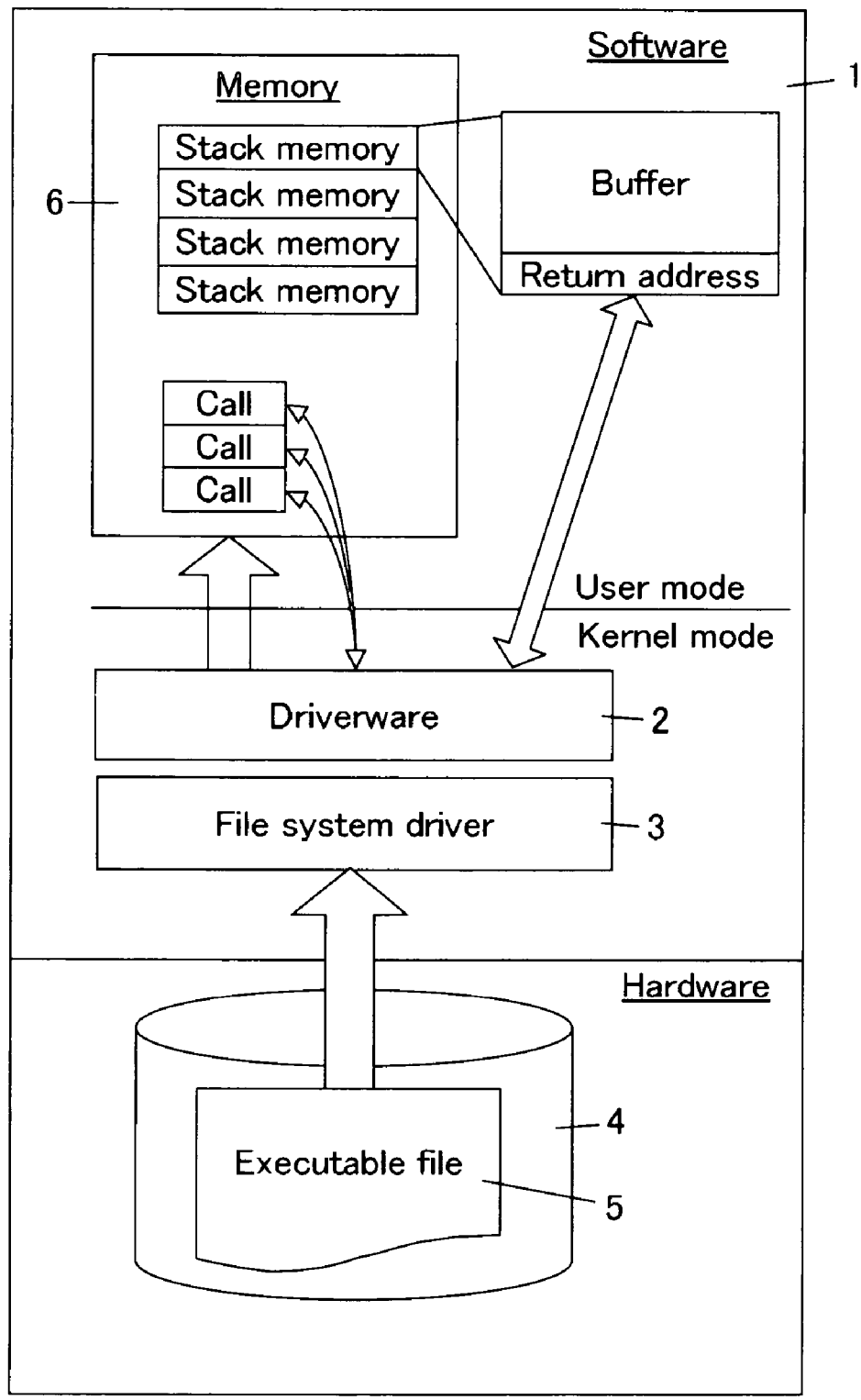
FIG. 1 is a schematic showing an outline of the present invention.
Figure 2:
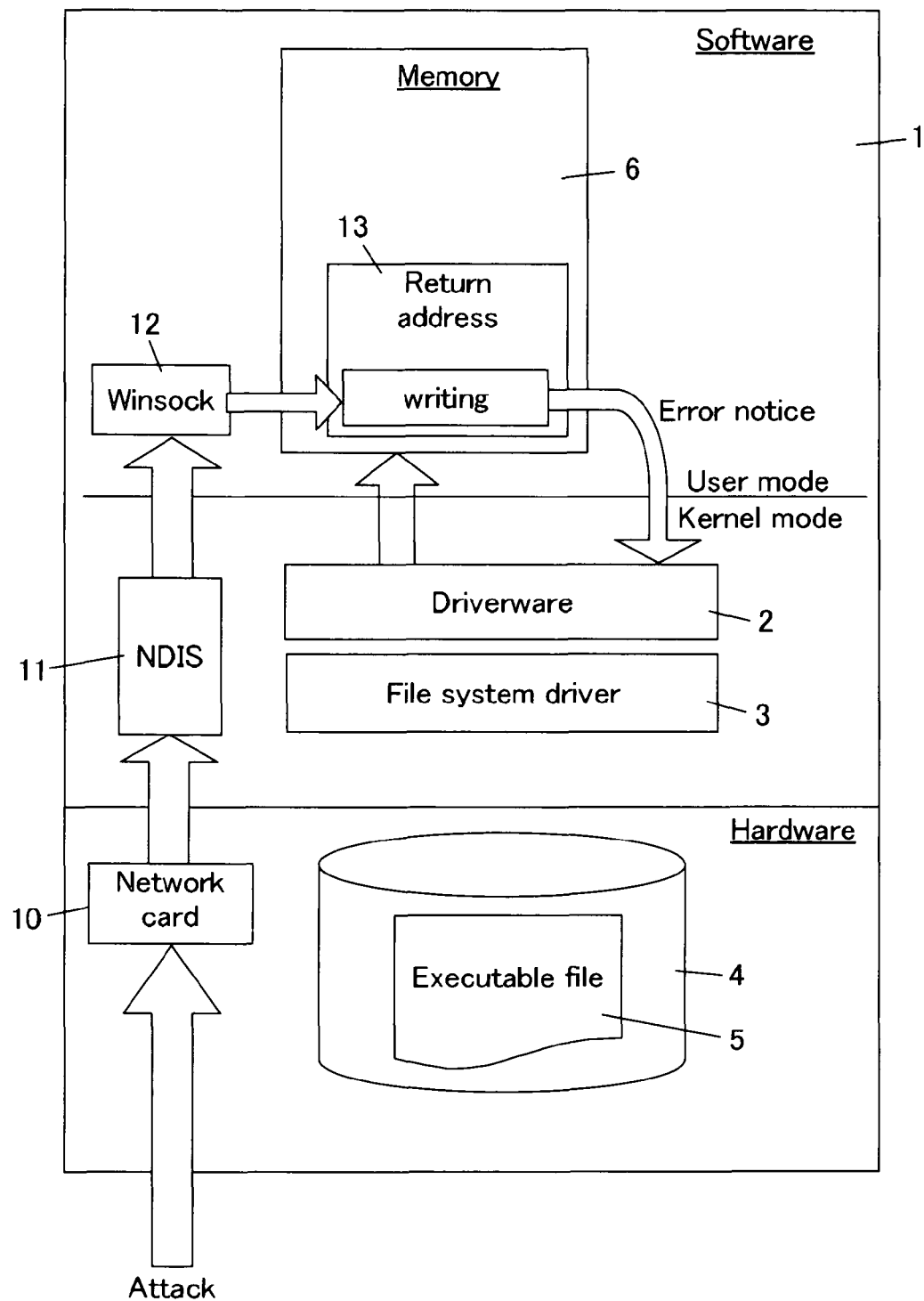
FIG. 2 is a schematic showing the error detection due to a buffer-overflow of the present invention.
Figure 3:
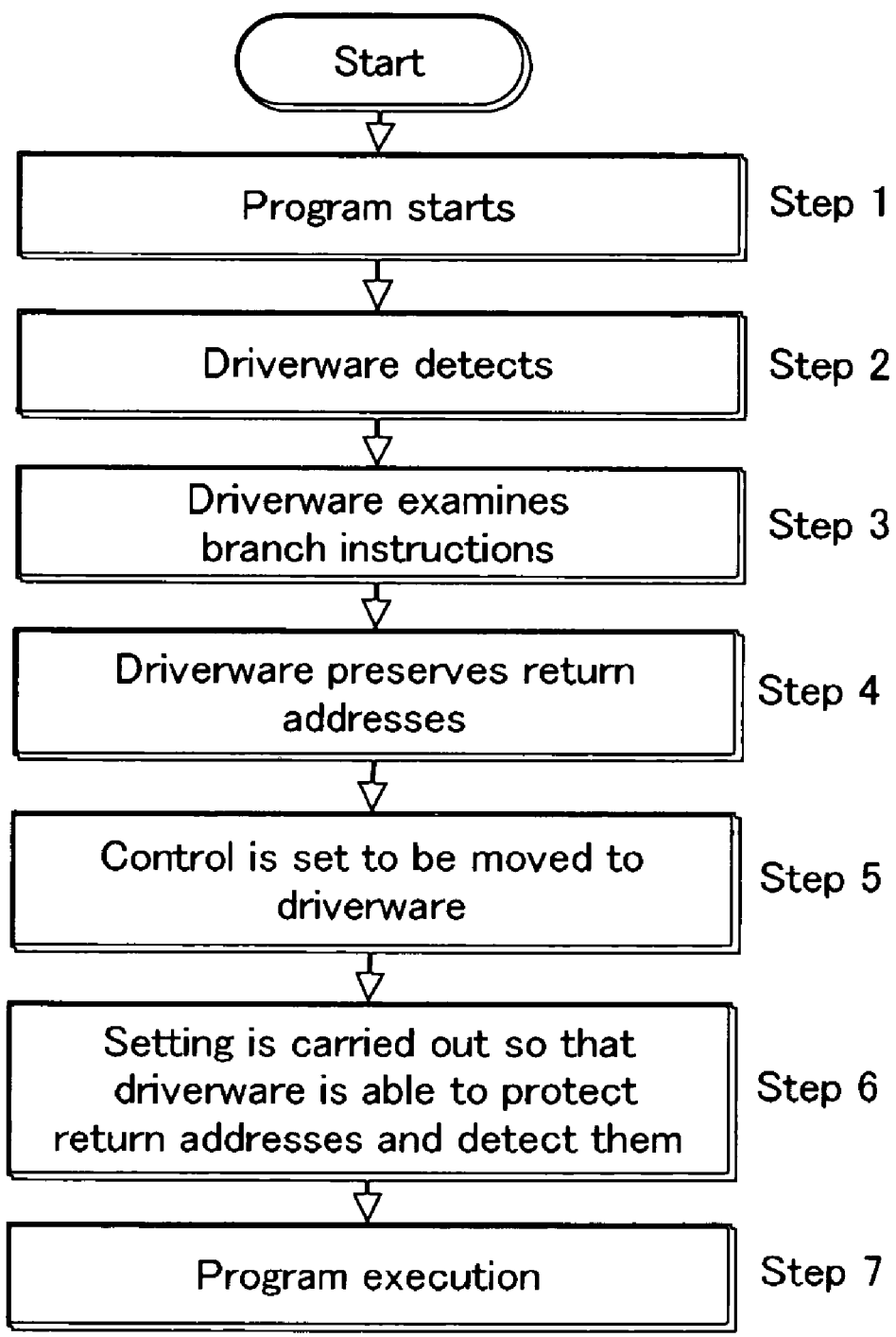
FIG. 3 is a flowchart showing a procedure when an executive file is loaded.
Figure 4:
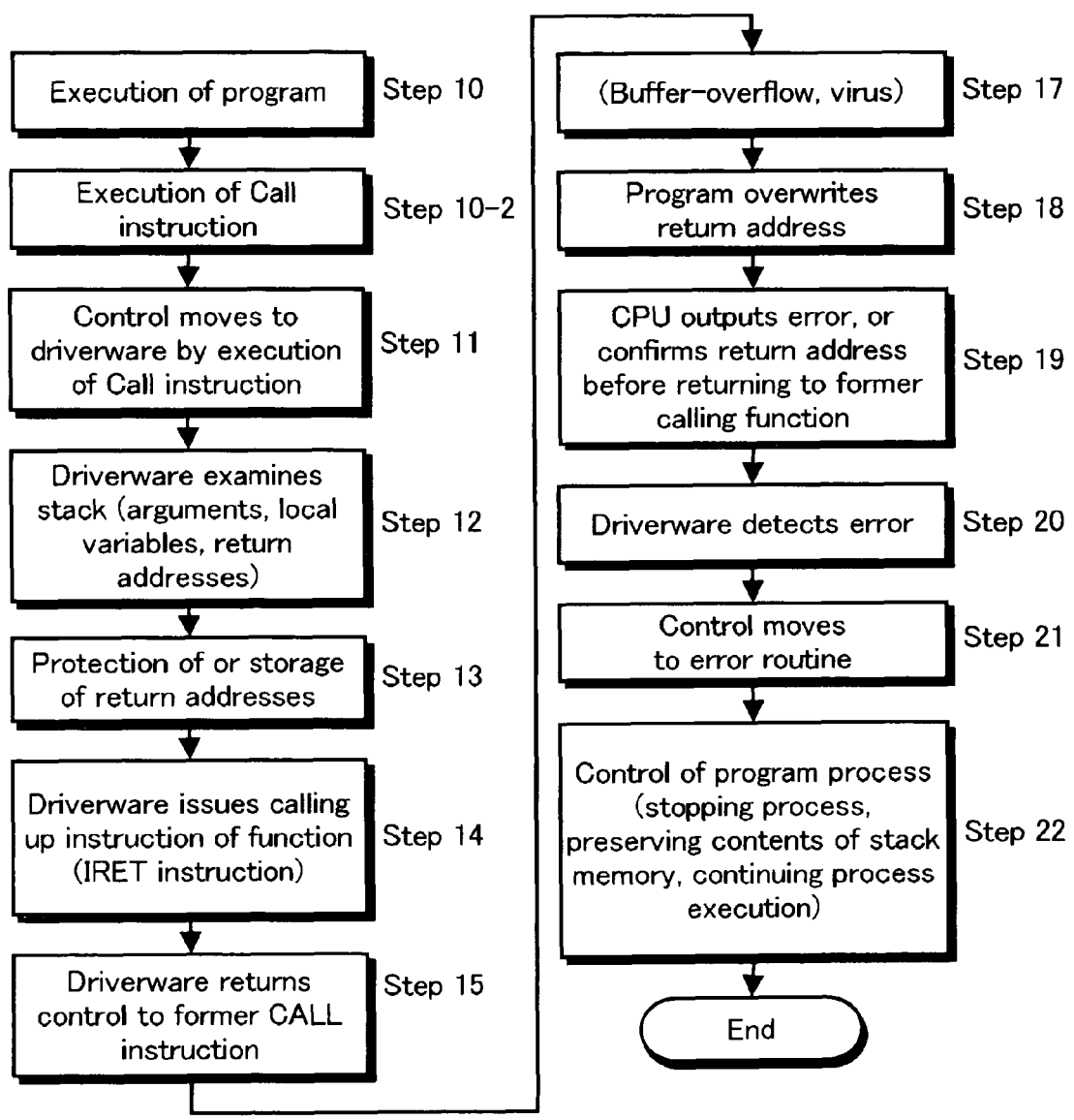
FIG. 4 is a flowchart showing a procedure when an executive file is executed.
Figure 5:
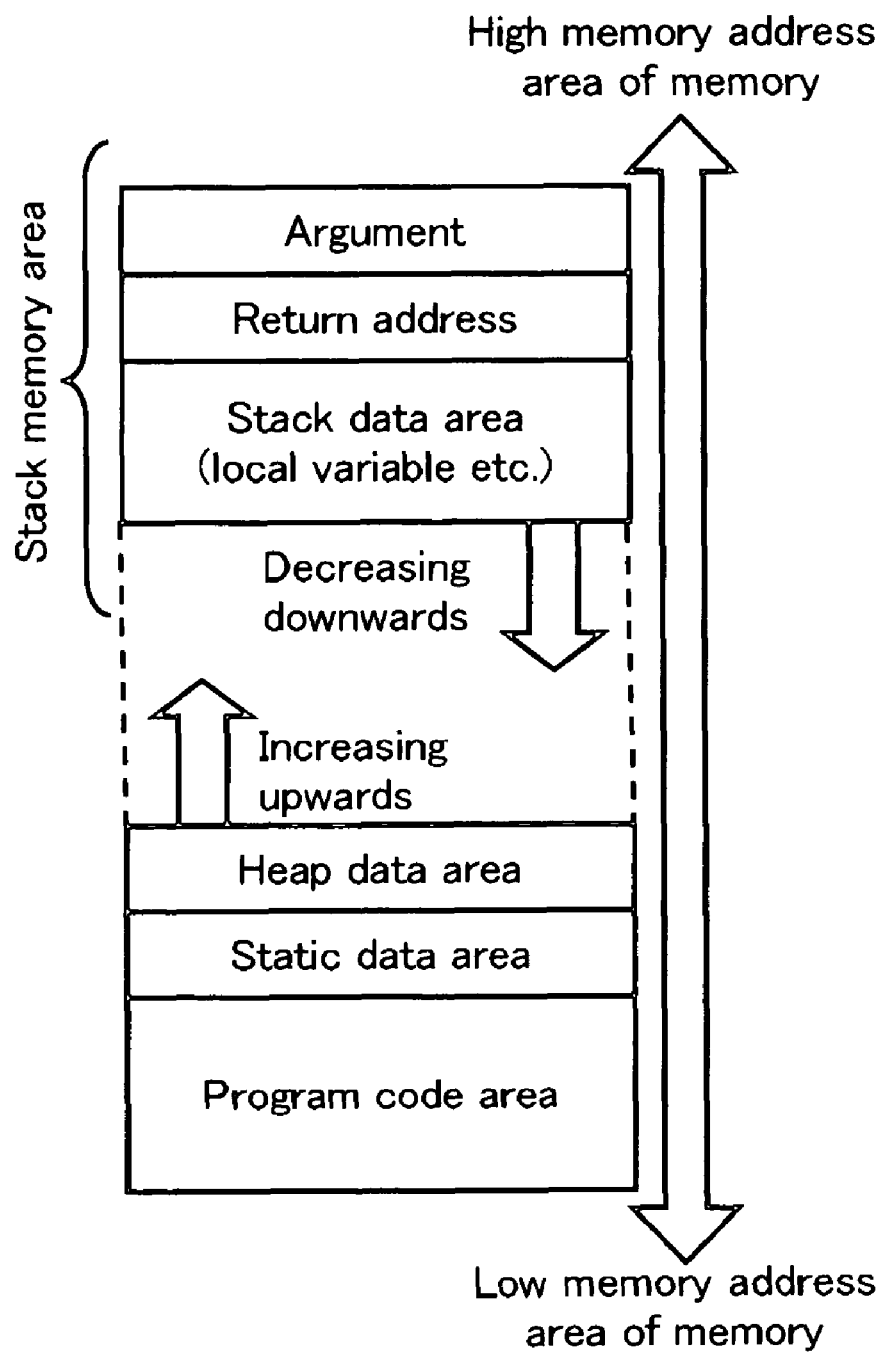
FIG. 5 is a drawing showing the architecture of a memory.
Figure 7:
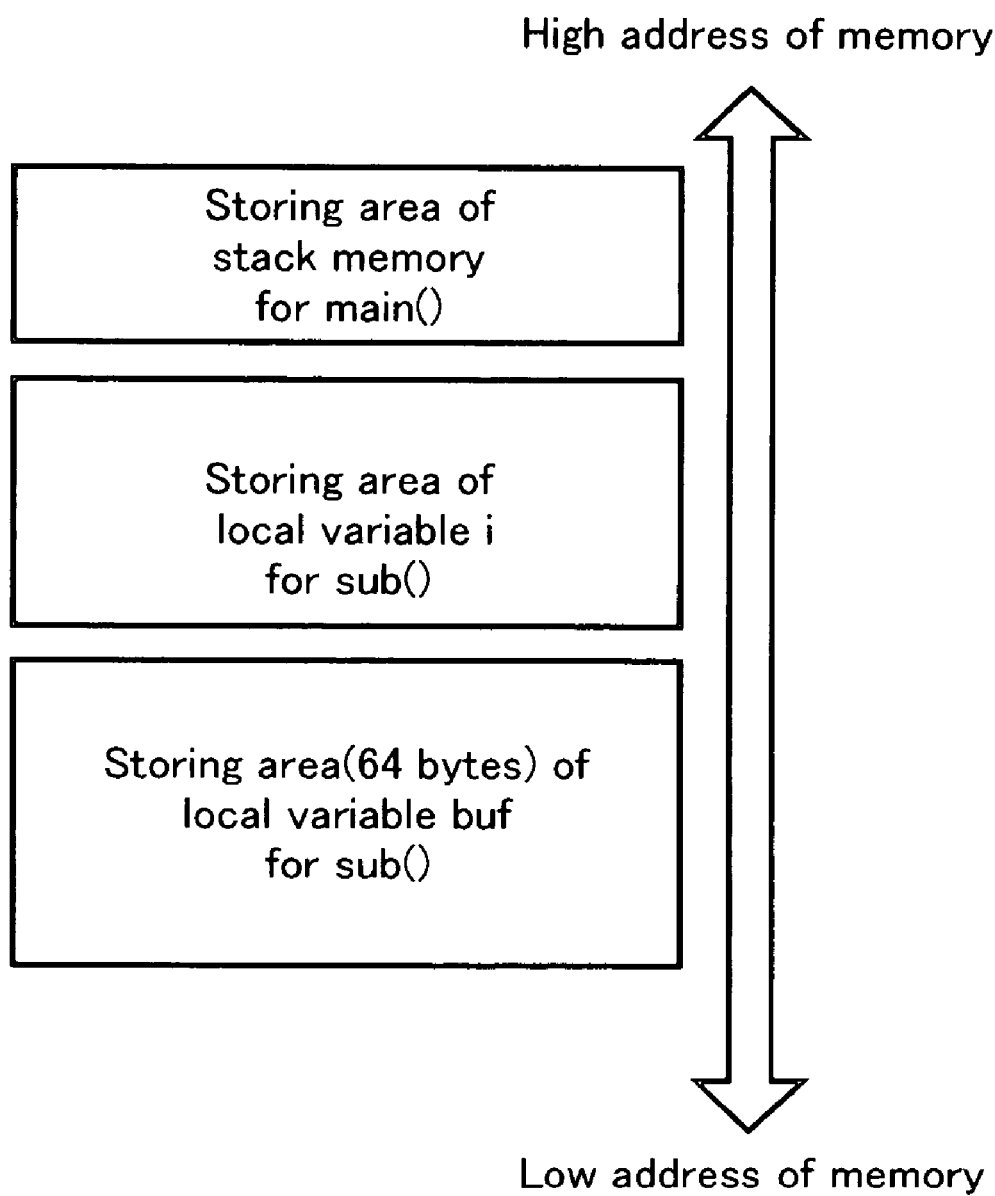
FIG. 7 is a drawing showing the architecture of a stack memory.
Figure 8:
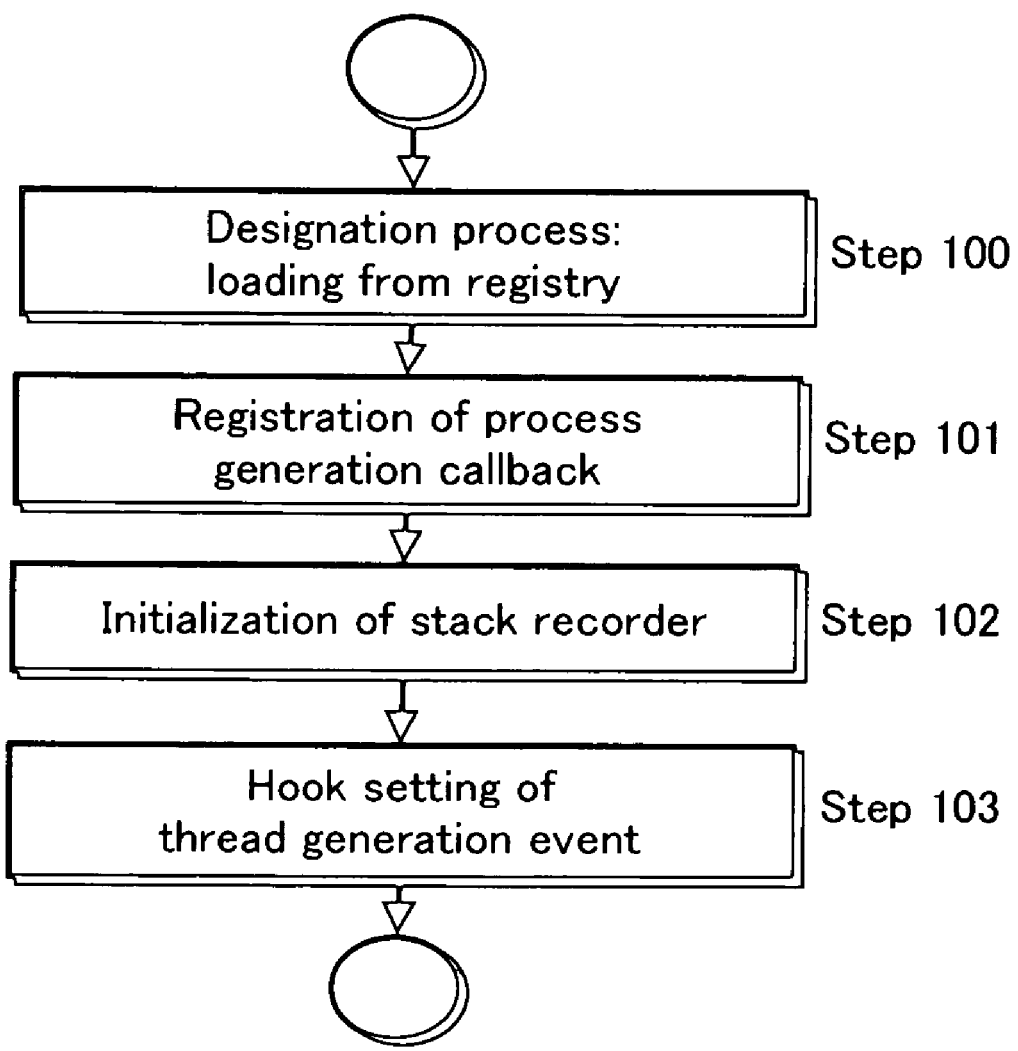
FIG. 8 is a flowchart showing a procedure of the initialization processing when a driverware starts.
Figure 9:
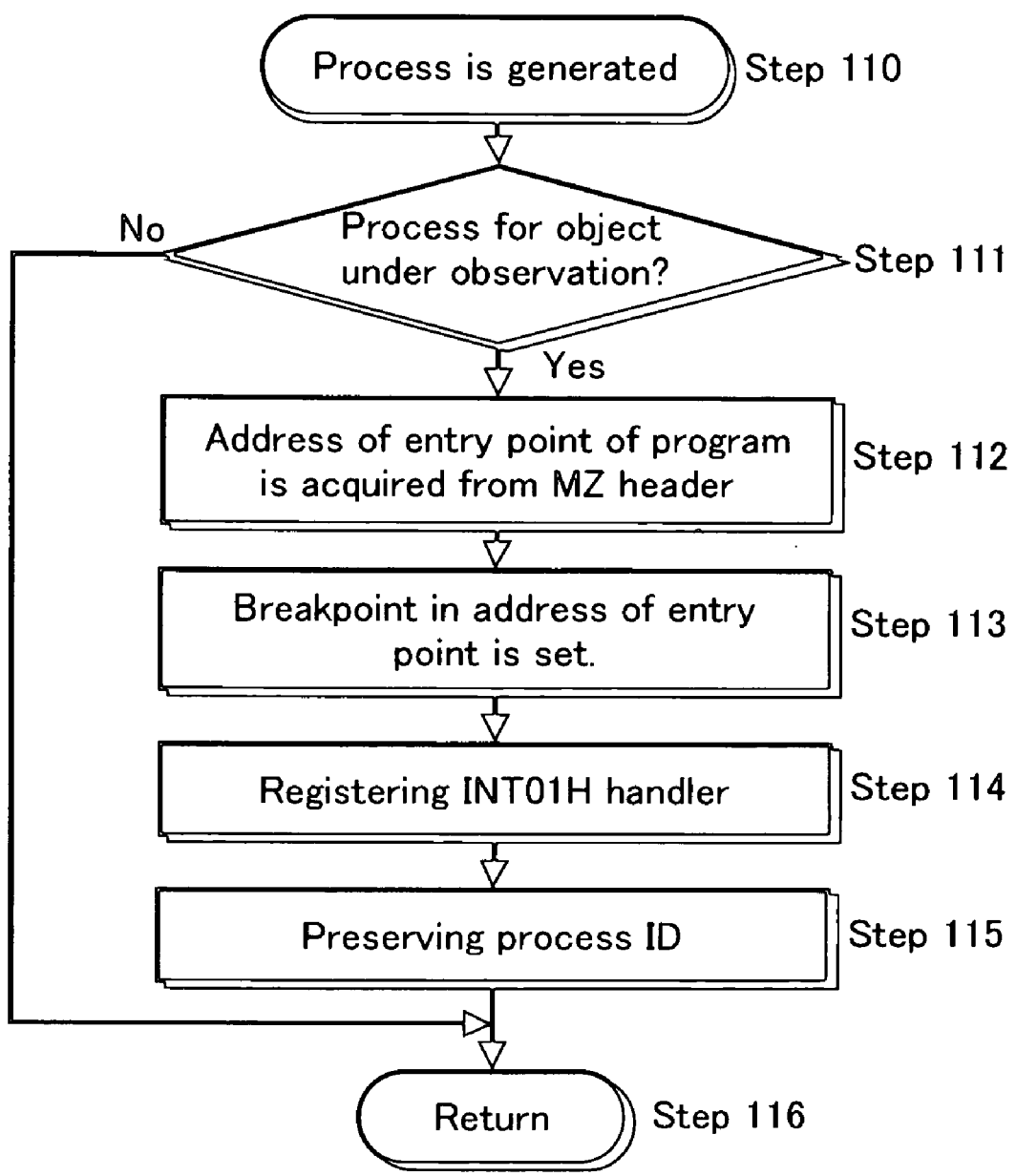
FIG. 9 is a flowchart showing a registration procedure of a process generation callback.
Figure 10:
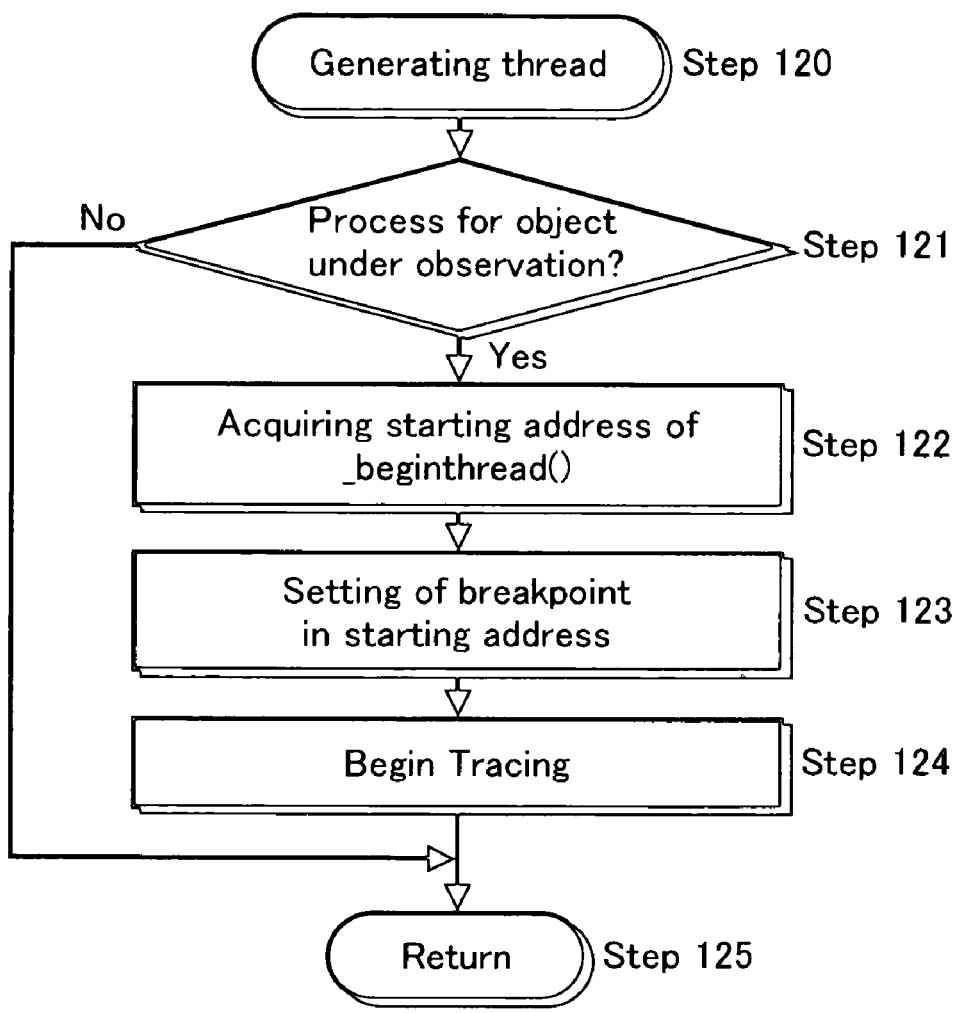
FIG. 10 is a flowchart showing a hook setting procedure of a thread generating event.
Figure 11:
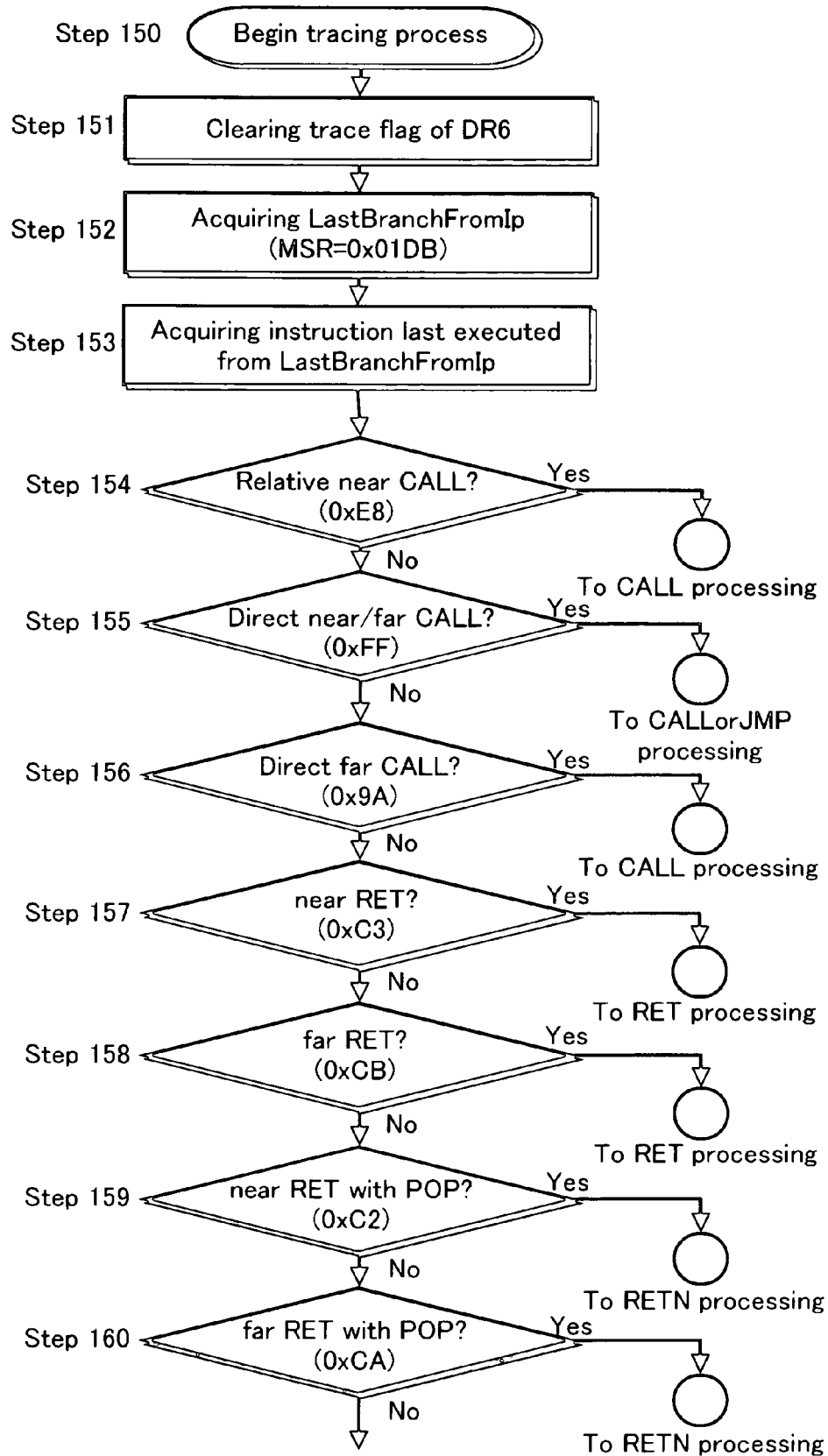
FIG. 11 is a flowchart showing a flow procedure when tracing branch commands such as CALL, RET are executed.
Figure 12:
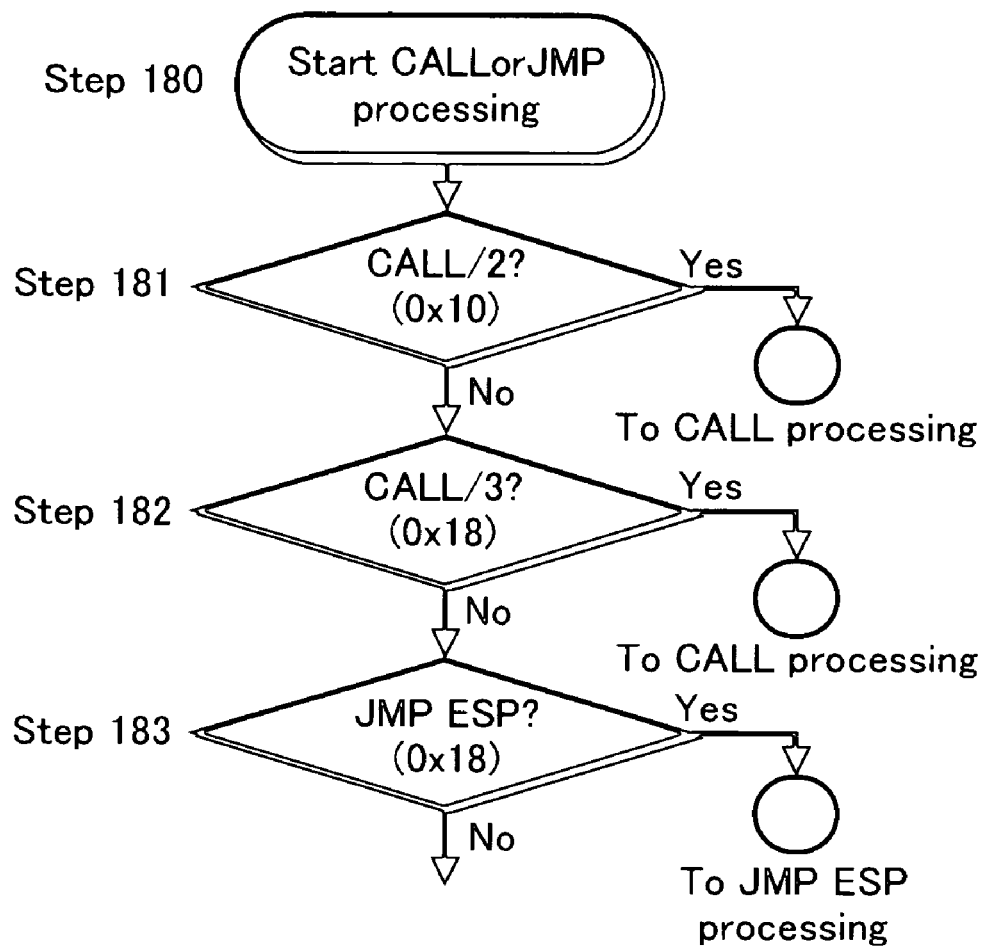
FIG. 12 is a flowchart showing a CALL or JMP procedure.
Figure 13:
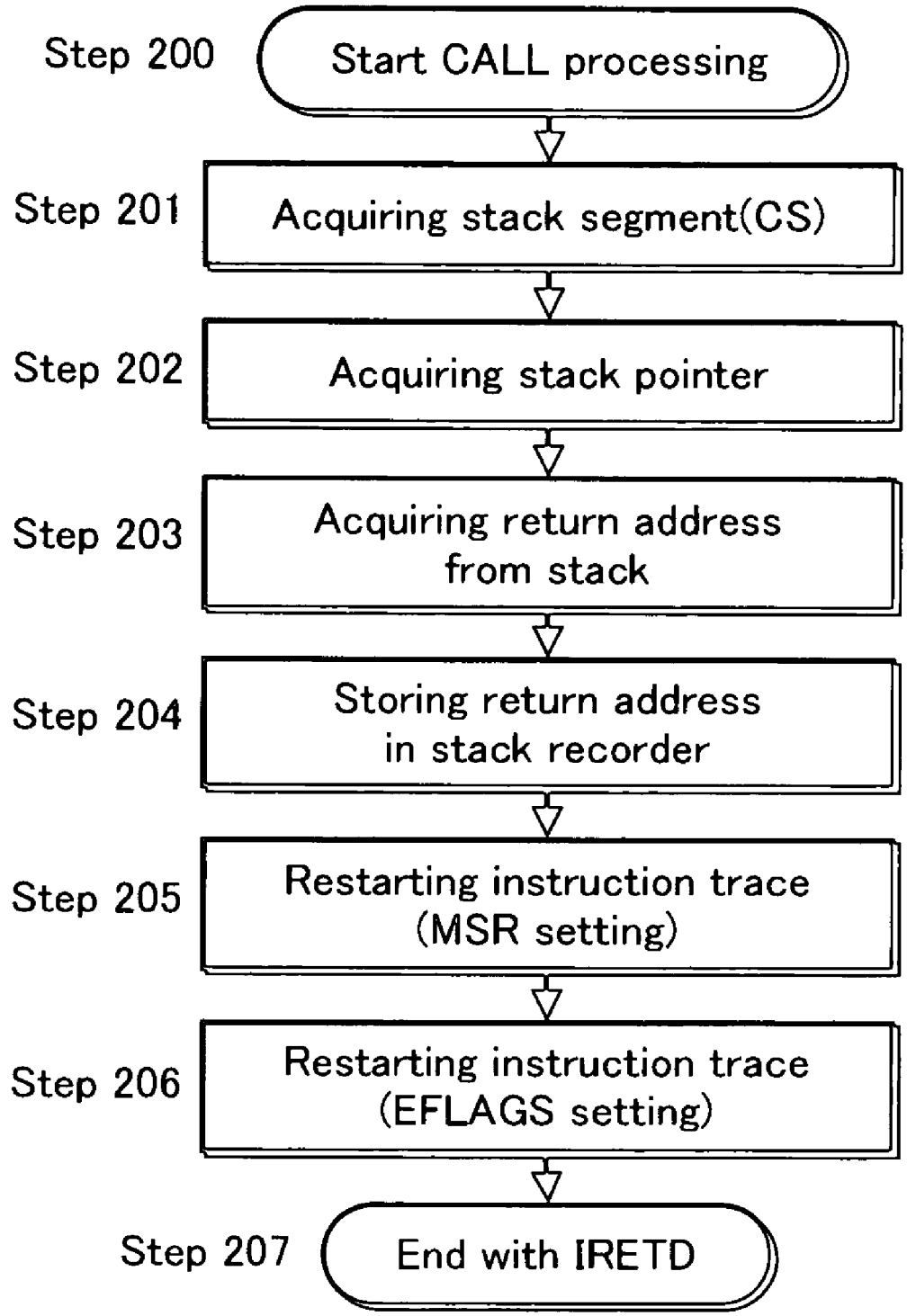
FIG. 13 is a flowchart showing an executing procedure of the CALL command.
Figure 14:
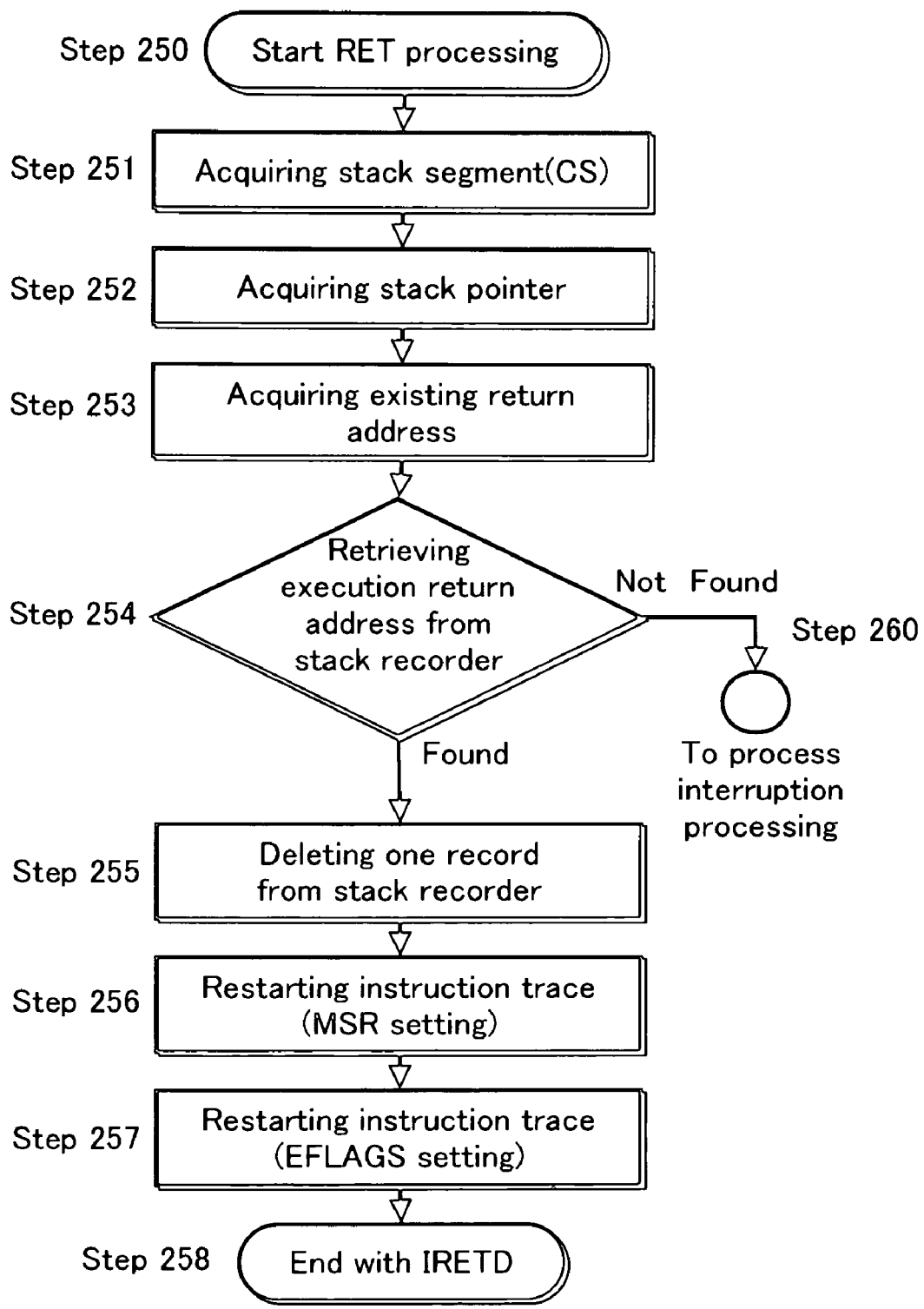
FIG. 14 is a flowchart showing an executing procedure of the RET command.
Figure 15:
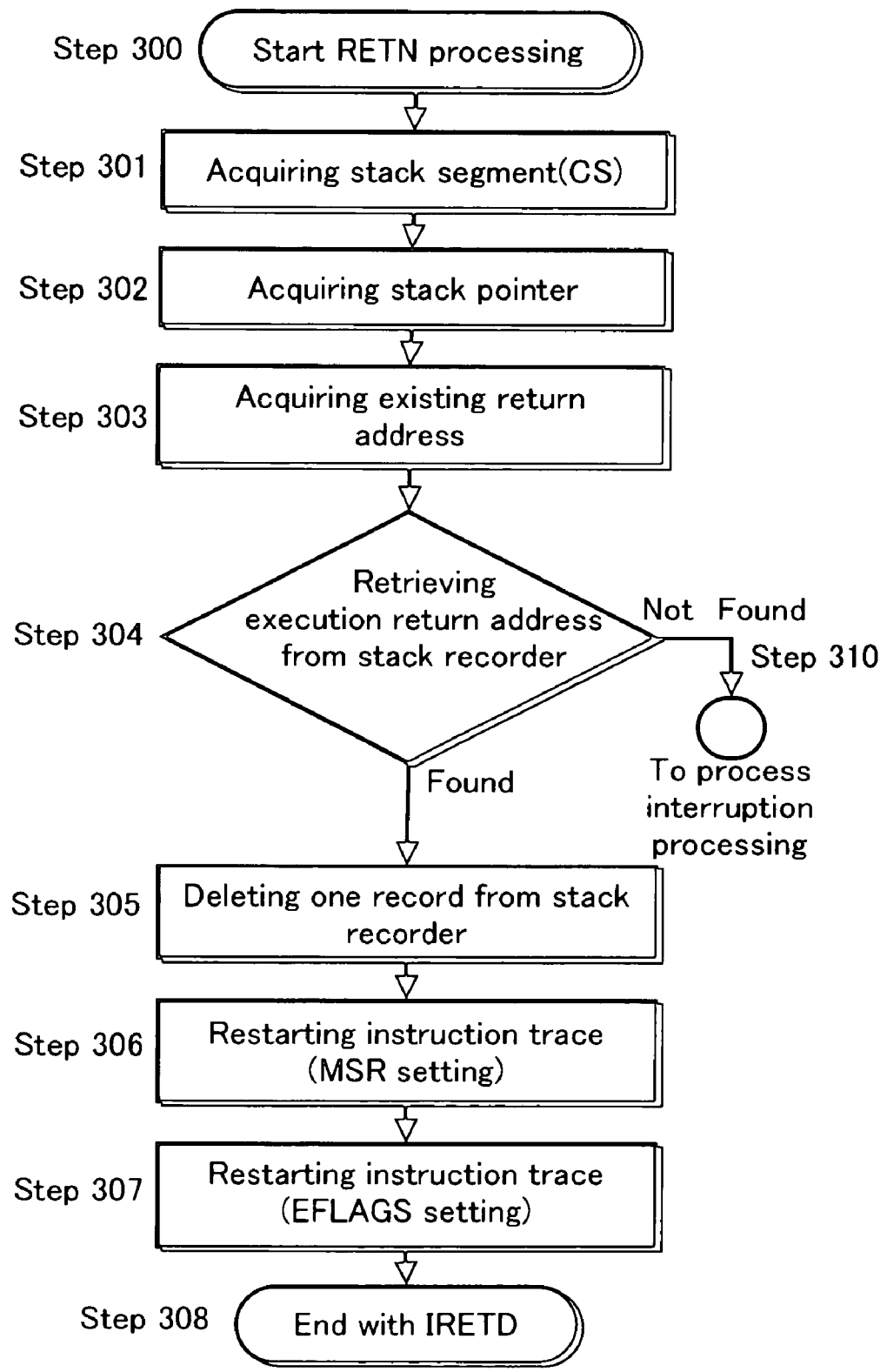
FIG. 15 is a flowchart showing an executing procedure of the RETN command.
Figure 16:
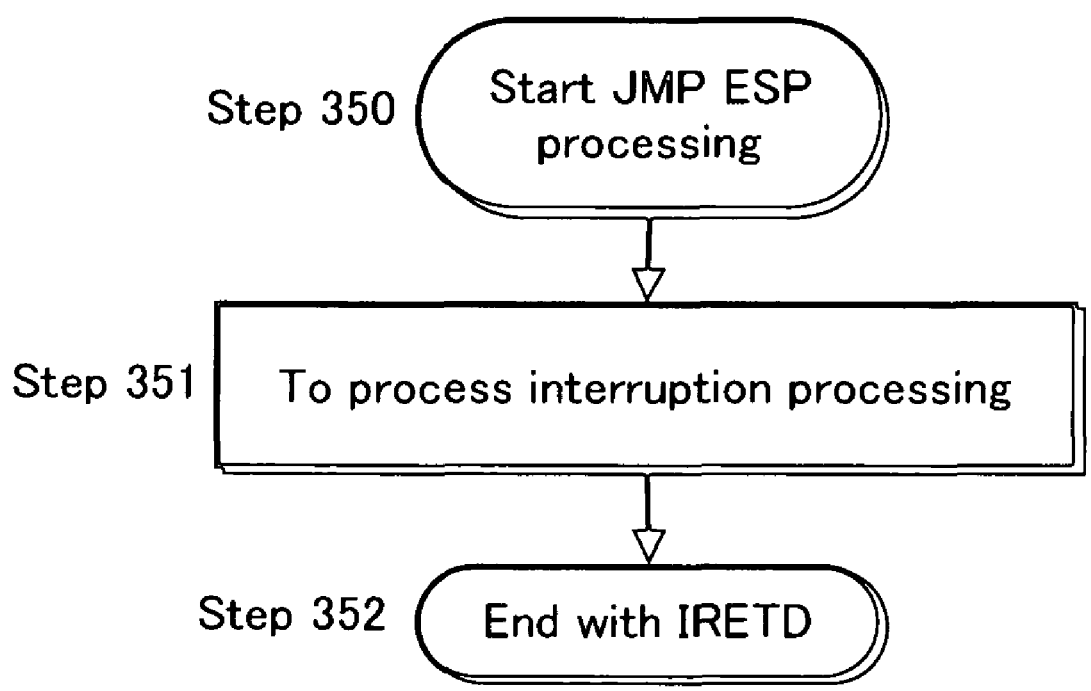
FIG. 16 is a flowchart showing a procedure of the JMP ESP process.

1 ... Software
2 ... Driverware
3 ... File system driver
4 ... Hard disk
5 ... Executable file
6 ... Memory
10 ... Network card
11 ... NDIS
12 ... Winsock

What is claimed is:

1. A false code execution prevention method for detecting a buffer-overflow of a memory, said buffer-overflow being that a return address stored in a stack memory area of said memory is overwritten by the execution of a false code; and for preventing an occurrence of said buffer-overflow; when a false code execution prevention program stored in a non-transitory computer-readable medium of an electronic computer is executed by a central processing unit having an architecture with a debug register; said false code execution prevention method comprising the steps of:
    backing up said return address;
    recording a memory address storing said return address in said debug register used for said debug function; and
    detecting a falsification of said return address using a debug function of said central processing unit, when said return address is falsified by said execution of said false code,
    wherein said detection of said detecting step is performed by production of an error signal by said central processing unit, when a value of said memory address registered in said debug register is falsified.

2. A false code execution prevention method according to claim 1, wherein said backing up is performed by preserving said return address in a memory area that is not storing data of an executing program.

3. A false code execution prevention method according to claim 2, further comprising: a means for detecting said buffer-overflow by comparing said return address stored in said stack memory area to the backed up address.

4. A false code execution prevention method according to claim 2, further comprising: a controlling means for re-writing said memory address to said return address that is preserved, when said return address is falsified.

5. A false code execution prevention method according to claim 1, wherein said return address is preserved by setting said stack memory area storing said return address to the read-only attribute;
    said detection of said detecting step is performed by an error signal being produced from said central processing unit, when performing writing in said stack memory area that is set at the read-only attribute; and
    said false code execution prevention method further comprising a controlling means for stopping said program or for controlling the flow of said program after receiving said error signal.

6. A false code execution prevention method according to claim 1, wherein said return address is a return address of one or more selected from a group including the process which is called when said program is executed, and a thread called up from said process.

7. A false code execution prevention program allowing an electronic computer to operate so as to be able to detect a buffer-overflow of a memory, said buffer-overflow being that a return address stored in a stack memory area of said memory is overwritten by the execution of a false code; and prevent an occurrence of said buffer-overflow; when a false code execution prevention program stored in a non-transitory computer-readable medium of said electronic computer is executed by a central processing unit having an architecture with a debug register;
    said false code execution prevention program comprising the steps of:
    analyzing a branch instruction contained in said program by obtaining said branch instruction, when said program is called up from said storing medium;
    extracting said return address of a process or a thread of said program;
    registering the address of said stack memory area storing said return address, in said debug address of a debug function of said central processing unit;
    controlling the flow of said program, when said program is executed;
    backing up said return address and said address by registering said return address and said address; wherein said central processing unit outputs an error signal with said debug function, when said return address is falsified in the execution of said program, said execution of said program is interrupted, and said flow of said program is moved to said controlling step.

8. A false code execution prevention program according to claim 7, wherein said controlling step has a step for stopping said program, when said return address is re-written.

9. A false code execution prevention program according to claim 7 or claim 8, wherein said controlling step has a step for re-writing said return address to said backed up return address, when said return address is re-written.

10. A false code execution prevention program according to claim 7 or claim 8, wherein said controlling step has a step for preserving a re-written value, when said return address is re-written.

11. A false code execution prevention program according to claim 7 is further comprising the steps of: protecting said return address by setting said stack memory area storing said return address to the read-only attribute, detecting the performance of said detection with an error signal being output by said central processing unit, when performing writing in said stack memory area, which is set at the read-only attribute, and controlling for stopping said program or controlling the flow of said program after receiving said error signal.

12. A false code execution prevention program according to claim 7, 8 or 11, wherein said program is one or more selected from a group including application software, software module of an operating system, kernel mode software, functions used therein, and subroutines used therein.

13. A false code execution prevention method for detecting a buffer-overflow of a memory, said buffer-overflow being that a return address stored in a stack memory area of said memory is overwritten by the execution of a false code; and prevent an occurrence of said buffer-overflow; when a false code execution prevention program stored in a non-transitory computer-readable medium of said electronic computer is executed by a central processing unit having an architecture with a debug register;

said false code execution prevention method comprising the steps of:

analyzing said program by obtaining a branch instruction contained in said program, when said program is called up from said storage medium;

registering an address of an instruction executed first in said program in said debug register used for a debug function to make to be called a trace call back function by said debug function, when said instruction is executed, tracing said branch instruction by said central processing unit during said program is executing; and disabling tracing to clear a trace flag of said debug function, when said branch instruction is detected by said analyzing step, reading data of said branch instruction executed most recently by said central processing unit into a general-purpose register, determining the type of said branch instruction from content of said general-purpose register, obtaining said return address from said memory address of said stack memory area storing said return address of a reading instruction (CALL), in the case of said branch instruction is said reading instruction of a subroutine of said program by said determining step, storing said return address in said memory, setting said trace flag, which is cleared; and resuming said tracing of said branch instruction, reading said return address, pointed by a return instruction, from said stack memory area, in the case of said branch instruction is said return instruction (RET, RETxx) by said determining step, comparing a value read by said reading step with a value stored by said storing step, setting said trace flag, which is cleared, in the case of said value read by said reading step is the same to said value stored by said storing step by said comparing step; and resuming said tracing of said branch instruction, and determining said return address of said reading instruction (CALL) to be falsified in the case of said value read by said reading step is not same to said value stored by said storing step by said comparing step; and controlling a flow of said program by performing one process or more processes selected from a group of stopping said flow of said program, pausing said flow of said program and executing an error routine, wherein said controlling step comprising the steps of:

rewriting said return address read by said reading step, by said return address stored in said memory by said storing step, and preserving the value, which is the value after rewritten and read by said reading step, and analyzing the type of attack and attack patterns by using this value.

14. A false code execution prevention method according to claim 13, wherein said program is one or more selected from a group including application software, software module of an operating system, kernel mode software, functions used therein, and subroutines used therein.

15. A non-transitory computer-readable medium for a false code execution prevention method that records said false code execution prevention program according to claim 13.

16. A non-transitory computer-readable medium for a false code execution prevention method that records said false code execution prevention program according to claim 14.

17. A false code execution prevention program allowing an electronic computer to operate so as to be able to detect a buffer-overflow of a memory, said buffer-overflow being that a return address stored in a stack memory area of said memory is overwritten by the execution of a false code; and prevent an occurrence of said buffer-overflow; when said false code execution prevention program stored in a non-transitory computer-readable medium of said electronic computer is executed by a central processing unit having an architecture with a debug register;

said false code execution prevention program comprising the steps of:

analyzing said program by obtaining a branch instruction contained in said program, when said program is called up from said storage medium;

registering an address of an instruction executed first in said program in said debug register used for a debug function to make to be called a trace call back function by said debug function, when said instruction is executed, tracing said branch instruction by said central processing unit during said program is executing; and disabling tracing to clear a trace flag of said debug function, when said branch instruction is detected by said analyzing step, reading data of said branch instruction executed most recently by said central processing unit into a general-purpose register, determining the type of said branch instruction from content of said general-purpose register, obtaining said return address from said memory address of said stack memory area storing said return address of a reading instruction (CALL), in the case of said branch instruction is said reading instruction of a subroutine of said program by said determining step, storing said return address in said memory, setting said trace flag, which is cleared; and resuming said tracing of said branch instruction, reading said return address, pointed by a return instruction, from said stack memory area, in the case of said branch instruction is said return instruction (RET, RETxx) by said determining step, comparing a value read by said reading step with a value stored by said storing step, setting said trace flag, which is cleared, in the case of said value read by said reading step is the same to said value stored by said storing step by said comparing step; and resuming said tracing of said branch instruction, and determining said return address of said reading instruction (CALL) to be falsified in the case of said value read by said reading step is not same to said value stored by said storing step by said comparing step; and controlling a flow of said program by performing one process or more processes selected from a group of stopping said flow of said program, pausing said flow of said program and executing an error routine, wherein said controlling step comprising the steps of:

rewriting said return address read by said reading step, by said return address stored in said memory by said storing step, and preserving the value, which is the value after rewritten and read by said reading step, and analyzing the type of attack and attack patterns by using this value.

18. A false code execution prevention program according to claim 17, wherein said program is one or more selected from a group including application software, software module of an operating system, kernel mode software, functions used therein, and subroutines used therein.

19. A non-transitory computer-readable medium for a false code execution prevention program that records said false code execution prevention program according to claim 17.

20. A non-transitory computer-readable medium for a false code execution prevention program that records said false code execution prevention program according to claim 18.

* * * * *